July 10, 1934.  F. S. SMITH  1,965,609
APPARATUS FOR STERILIZING
Filed July 30, 1932  3 Sheets-Sheet 1
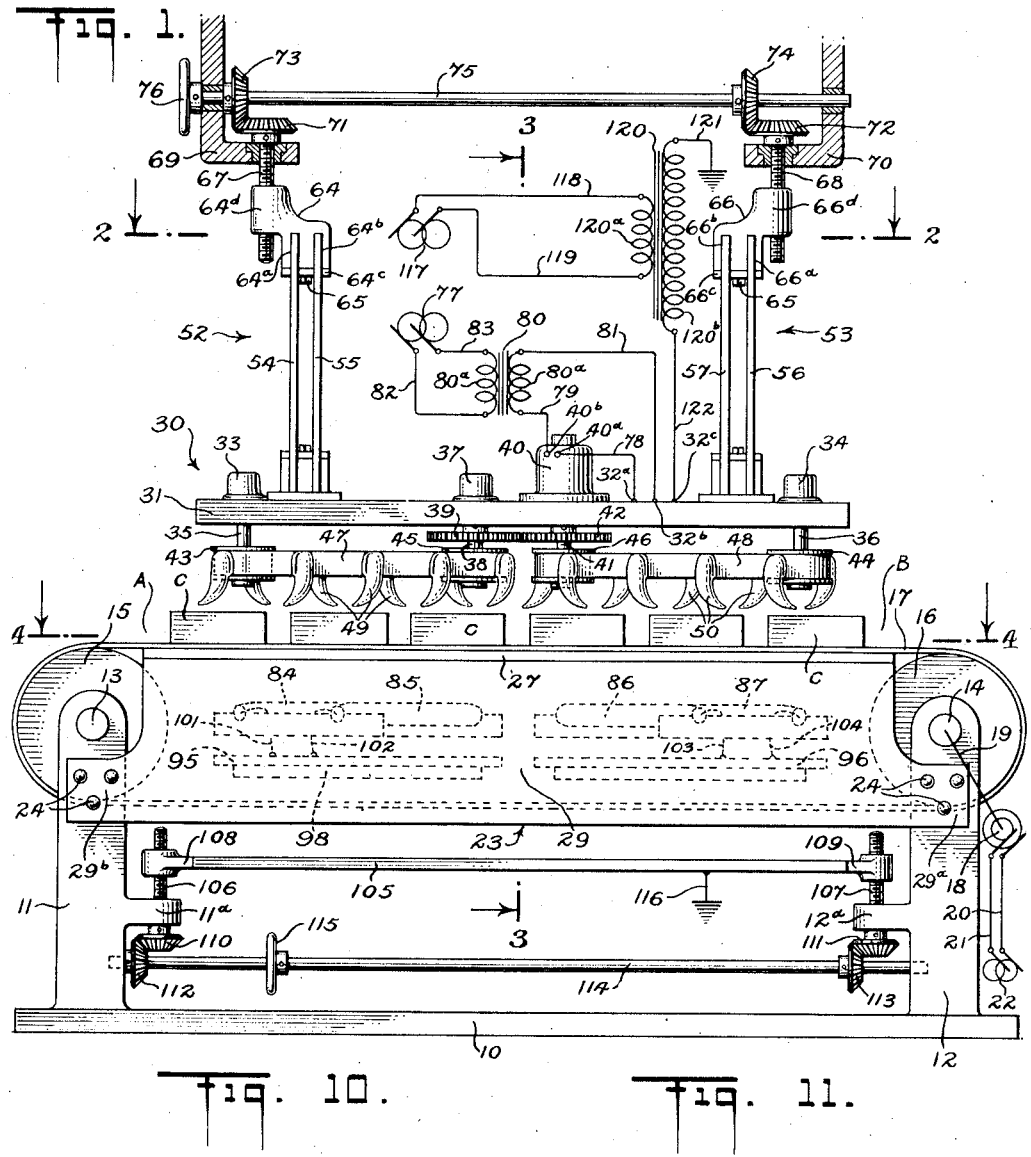
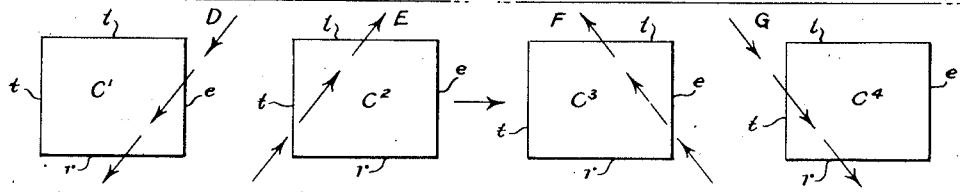
Franklin S. Smith INVENTOR
BY
James Blair Curtis
ATTORNEYS July 10, 1934.  F. S. SMITH  1,965,609
APPARATUS FOR STERILIZING
Filed July 30, 1932   3 Sheets-Sheet 2
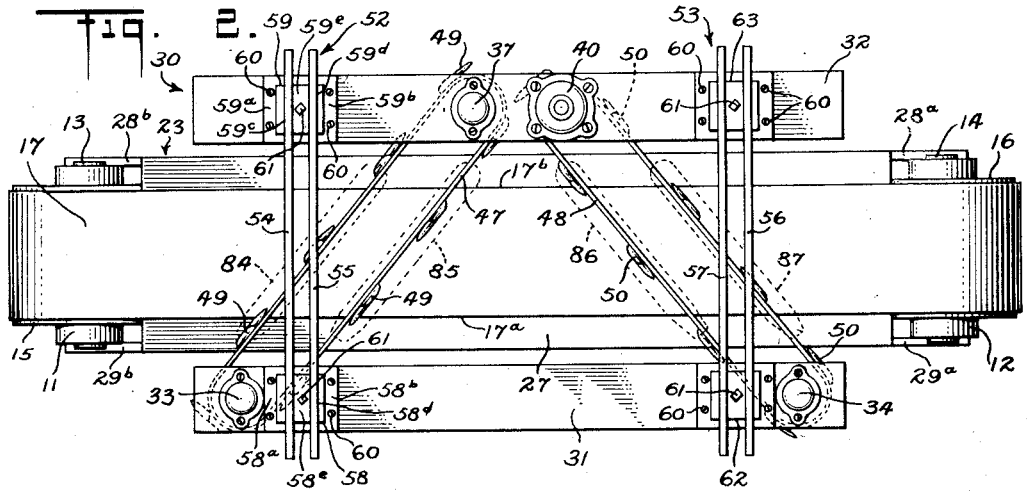
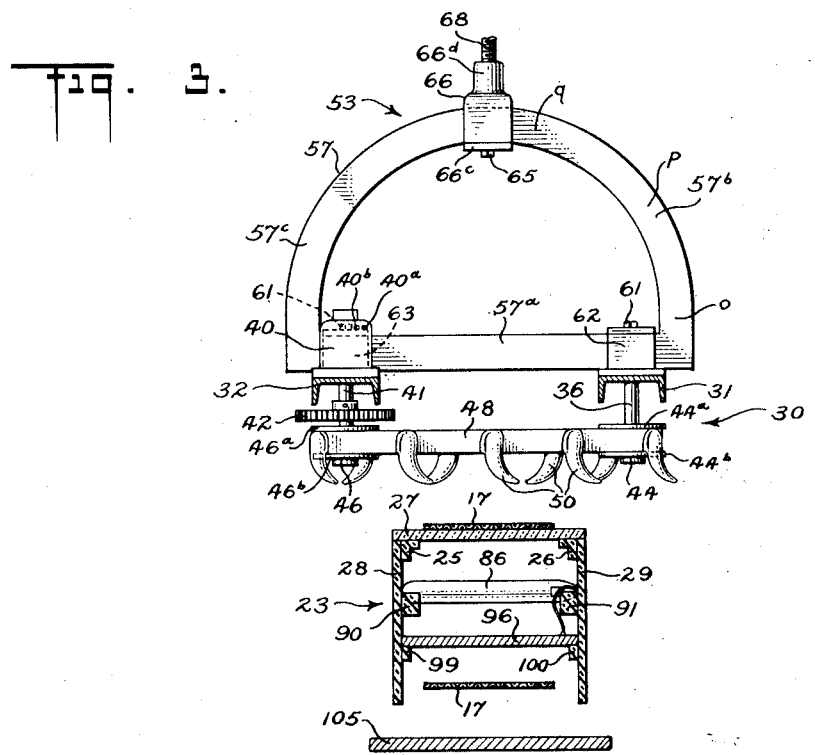
Franklin S. Smith
INVENTOR
BY Janney, Blair Curtis
ATTORNEYS July 10, 1934. F. S. SMITH 1,965,609
APPARATUS FOR STERILIZING
Filed July 30, 1932 3 Sheets-Sheet 3
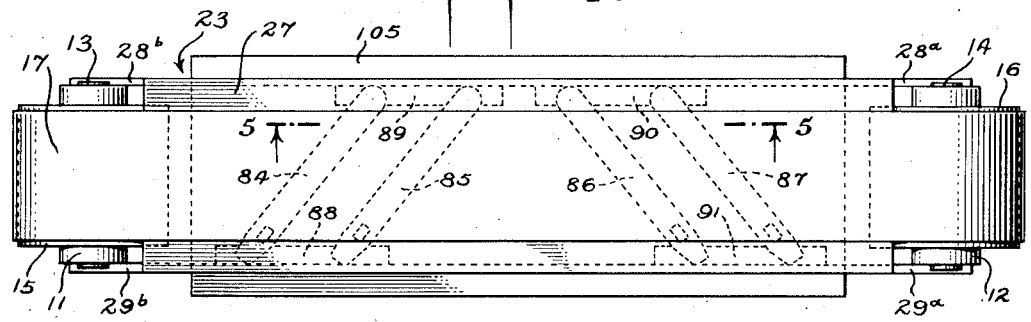
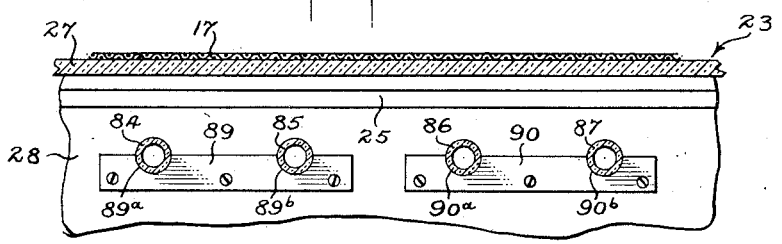
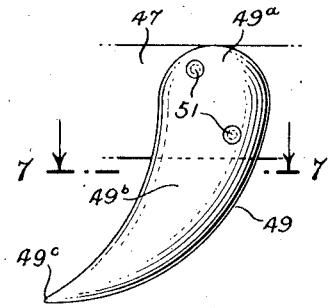 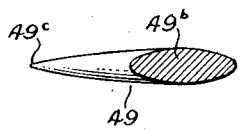 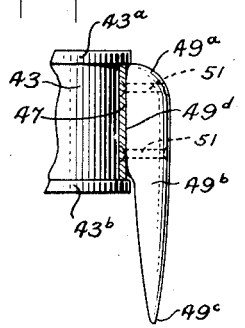
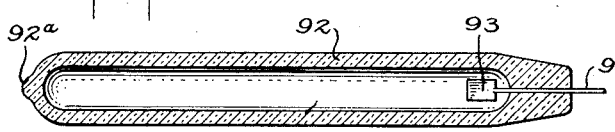
Franklin S. Smith
INVENTOR
BY Janney, Blair Curtis
ATTORNEYS Patented July 10, 1934

1,965,609

UNITED STATES PATENT OFFICE 1,965,609

APPARATUS FOR STERILIZING

Franklin S. Smith, New Haven, Conn.

Application July 30, 1932, Serial No. 626,468

23 Claims. (Cl. 175—311)

This invention relates to an apparatus for destroying insect life in food and other products.

One of the objects of this invention is to provide an art and apparatus for rapidly and efficiently treating food, tobacco and other products containing insect life such as bugs and/or their eggs, larvæ and pupæ to dependably and completely destroy such insect life without in any way harming or undesirably affecting the products so treated. Another object is to provide an art and apparatus for electrically treating the above-mentioned products in a thoroughly economical, rapid and efficient manner which is well adapted to handle the various kinds and quantities of products either in bulk or in packaged form, without sacrificing any of the above-mentioned advantages. Another object is to provide an art and apparatus of the above-mentioned character in which a greater product-handling capacity than heretofore known and/or used apparatuses is provided, or for the same product-handling capacity permitting a reduction in size, weight, and cost of apparatus and increased speed of operation. Another object is to provide an art and apparatus of the above-mentioned character in which there is realized a simplicity and economy of construction, together with a highly efficient and thoroughly dependable treating operation. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which are shown several of the various possible embodiments of the electrical and mechanical features of my invention, Figure 1 is a front elevation of the apparatus, certain parts being broken away to more clearly disclose certain features of the invention and other parts being shown diagrammatically, Figure 2 is a detached plan view of the apparatus substantially as seen along the line 2—2 of Figure 1, Figure 3 is a vertical cross-sectional view of the apparatus substantially as seen along the line 3—3 of Figure 2, Figure 4 is a detached plan view of the conveyor structure employed in the apparatus of Figure 1 on an enlarged scale, Figure 5 is a detached vertical sectional view of certain features of my invention substantially as seen along the line 5—5 of Figure 4, Figure 6 is a front elevation on an enlarged scale of an electrode member employed in the apparatus of Figure 1, Figure 7 is a horizontal sectional view of an electrode member as seen along the line 7—7 of Figure 6, Figure 8 is a detached side elevation on an enlarged scale of an electrode member and its related support, Figure 9 is a vertical longitudinal section on an enlarged scale of a gaseous conduction device employed in the apparatus of Figure 1, and Figures 10 and 11 are fragmentary plan views of the conveyor belt showing packages thereon and indicating diagrammatically certain actions on the packages by the different electrode structures.

Similar reference characters refer to similar parts throughout the several views of the drawings.

Referring now to the drawings and more particularly to Figure 1, there is diagrammatically shown an elongated bedplate 10 to which are fastened in any suitable manner, as by screws or bolts, the upstanding supports 11 and 12. Journaled within the upper end portions of the respective supports 11 and 12 are the horizontally extending shafts 13 and 14 about which are mounted the rotatable drums 15 and 16.

A conveyor belt 17 of some suitable material, such as cotton or asbestos, having high electrical insulating properties combined with flexibility and strength is maintained in a substantially horizontal position by means of drums 15 and 16.

Motion is transmitted to belt 17 by means of a motor diagrammatically shown at 18 which is mechanically connected as shown at 19 to the shaft 14 associated with drum 16. Electrical power is supplied to the motor by means of conductors 20 and 21 connected to a suitable source of energy 22. Illustratively, a single phase induction motor connected to a suitable source of single phase 60 cycle alternating current may be used.

The shaft 14 together with its associated rotatable drum 16 is preferably driven in a clockwise direction so that the belt driving tension is put on the upper half of the belt 17 in order to reduce the belt sag of the upper surface. Belt sag is further prevented or in fact substantially eliminated by means of the light supporting frame work 23, the upper surface of which is substantially plane and which serves as a support and guide for the belt 17. The ends of frame 23 are preferably fastened to the upstanding supports 11 and 12 by suitable screws 24.

To give a light weight supporting frame construction yet one which is rigid and strong and which in addition has high electrical insulating properties, the elongated frame 23 preferably comprises (see also Figures 2 and 3) a pair of parallel angle sections 25 and 26 preferably made of a suitable rigid insulating material, such as dielecto, to which are fastened in any suitable manner as by screws or bolts (not shown) a substantially plane elongated upper member 27 and the parallel vertically extending side members 28 and 29.

The frame work resists a downward bending due to the edgewise supporting characteristics of the side members 28 and 29, and resists lateral bending because of the upper elongated member 27. As shown in Figure 1, the end portions of the downwardly extending side members 28 and 29 are provided with the lower longitudinal end extensions 29$^a$ and 29$^b$ for the member 29, and 28$^a$ and 28$^b$ for the member 28 (see also Figure 2) by means of which the frame work 23 is fastened to and supported by the upstanding supports 11 and 12 as set forth above.

To assure a support for the belt 17 having high electrical insulation properties, the various members comprising the frame 23 are preferably made of dielecto although any other material, such as laminated bakelite or press-board, may be used. Thus, the conveyor belt 17 is so supported that its upper side moves along in substantially plane surface even when conveying a substantially heavy load, due to the truss-like characteristics of the supporting frame work 23.

Articles to be treated or sterilized, in a manner to be described hereinafter, are placed on the left-hand end of the conveyor, as seen in Figure 1, or at a point A in any suitable manner where they are conveyed by the belt 17 illustratively driven, as above-mentioned, by motor 18 in a direction from left to right, as seen in Figure 1, and discharged at the right-hand end of the conveyor, or at a point B, in any convenient manner (not shown).

Intermediate the point of charge A and the point of discharge B, the conveyor transports the articles beneath the electrode structure generally shown at 30 preferably positioned midway between supports 11 and 12 (see Figure 1), and substantially symmetrically crosswire of the conveyor (see Figure 3).

The operating plane of the electrode structure is preferably maintained substantially parallel to the upper article-carrying surface of the conveyor, the purpose of which will appear more fully hereinafter.

The electrode structure 30 preferably comprises a pair of parallel channel iron sections 31 and 32 (see Figure 2) having their channel sections extending downwardly, as better shown in Figure 3. The channel iron sections are preferably maintained in spaced relation on opposite sides of the conveyor belt 17, in a manner to be described more fully hereinafter, with their longitudinal axes substantially parallel to the direction of motion of the belt, and with their common plane substantially parallel to the conveying surface of the belt.

Suitably mounted adjacent the ends of channel iron section 31 are the thrust bearings diagrammatically shown at 33 and 34, which are adapted to rotatably support shafts 35 and 36 respectively in a vertically downwardly extending position (see Figure 1).

Adjacent the middle of channel iron member 32 there is mounted a third thrust bearing diagrammatically shown at 37 adapted to rotatably support a vertical downwardly extending shaft 38 having fastened thereto as, for example, by keys or set screws, a gear 39.

Adjacent thrust bearing 37 there is mounted on the channel iron section 32 a motor 40 having a vertical downwardly extending shaft 41 to which is fastened in any suitable manner a gear 42 which engages gear 39 so that upon rotation of the downwardly extending motor drive shaft 41 there will be an attendant rotation of the shaft 38. Preferably the gears 39 and 42 are the same size so that there is preserved a 1:1 speed ratio between the drive shaft 41 and the driven shaft 38.

Suitably fastened to the lower end portions of the vertical downwardly extending shafts 35, 36, 38 and 41 are pulley members 43, 44, 45 and 46 respectively, all of which are preferably of the same size for economical reasons and preferably lie in a common plane substantially parallel to the upper conveying surface of conveyor belt 17.

Pulley members 43 and 45 serve to support a substantially flat metallic belt 47, both sides of which are oblique to the direction of motion of the conveyor belt 17 (see Figure 2). The supporting relation between belt and pulleys is preferably maintained by means of raised lower edge portions 43$^b$ and 45$^b$ of the respective pulley members 43 and 45. A possible riding up of the belt is effectively prevented by means of upper raised portions 43$^a$ and 45$^a$ provided on the respective pulley members 43 and 45.

Similarly pulley members 44 and 46 serve to support a flexibly metallic belt 48, the sides of which are maintained oblique to the direction of motion of the conveyor belt in a sense opposite to that of metallic belt 47. Likewise the belt 48 is maintained in operative position by pulley members 44 and 46 by means of lower and upper raised edge portions 44$^b$ and 46$^b$, and 44$^a$ and 46$^a$ respectively of the respective pulley members 44 and 46.

The mounting of pulley members 43 and 45 is such with respect to the mounting of pulley members 44 and 46 that their respective flexible belt members 47 and 48 lie at angles of substantially 45° with respect to the direction of travel of conveyor belt 17; the belt 47 being inclined to the left, illustratively at 45° looking along the belt 17 in the direction of motion as seen from the left of Figure 2, while the belt member 48 is inclined to the right at an angle illustratively, 45°.

Energization of the drive motor 40, in a manner to be more fully described hereinafter, causes rotation of the drive pulley 46 associated with metallic belt 48, and due to the geared relation between motor drive shaft 41 and the adjacent shaft 38 causes a rotation of the drive pulley 45 associated with metallic belt 47. For an assumed clockwise rotation of the motor 40 looking downward along the length of drive shaft 41, the belt 48 (see Figure 2) will move in a clockwise direction, while the belt 47 will move in a counterclockwise direction.

The diameters of the drive pulleys 45 and 46 and the speed characteristics of the drive motor 40 are such that the metallic belts 47 and 48 are driven in directions indicated above, illustratively, at a speed of 4,000 feet per minute.

Suitably fastened to the metallic belts 47 and 48, as by riveting thereto (see Figure 8), are the electrode members 49 and 50 respectively. The electrode members 49 associated with metallic belt 47 (see Figures 6, 7 and 8) are preferably elongated in form having an upper end portion 49ª well rounded off, and a downwardly curved and tapered body portion 49ᵇ ending in a well rounded off tip portion 49ᶜ.

These electrode members are preferably made of aluminium and conveniently cast in the form described, the various surfaces and particularly the extreme tip portions being highly polished, the purposes of which will appear more fully hereinafter. The aluminium electrode member gives a construction which is highly electrically conductive and which at the same time is extremely light in weight so that the centrifugal forces on the belt driven electrode members are minimized and greater driving speeds permitted.

One side of the electrode members 49 adjacent the upper well rounded off end portion 49ª is provided with a flat surface 49ᵈ (see Figure 8) which is adapted to firmly contact the outside surface of the metallic belt 47. A secure engagement between the various electrode members 49 and belt member 47 is assured illustratively by means of rivets 51.

The mid tapered portion 49ᵇ and extreme tip portion 49ᶜ of the electrode members are offset from the flat surface 49ᵈ (see Figure 8) so as to provide ample space for the lower flanged rim portions 43ᵇ and 45ᵇ of the pulley members 43 and 45 respectively as the various electrode members pass about the pulley members in driving metallic belt 47.

The various electrode members 49 are preferably so fastened to metallic belt 47 that their lower extreme tip portions 49ᶜ are in trailing relation with respect to their mid portions 49ᵇ and upper rounded off portions 49ª in the assumed counter-clockwise drive of the belt.

While the total number of electrode members to be mounted on the metallic drive belt is dependent upon the speed of drive, the total belt length, and numerous related factors, the electrode members are conveniently evenly spaced along the belt so that the upper and main body portion of one electrode member falls short of overlapping the trailing tip portion of the electrode member immediately preceding it along the direction of belt travel. The spacing between electrode members is preferably such that as one electrode member in its slantwise progress above the conveyor belt 17 is about to leave the region of the one belt edge, another electrode member is about to enter the region of the other belt edge. Thus the same number of electrode members overhang the conveyor belt in all stages of their rapid passage across the conveyor; the advantages of this construction will appear more fully hereinafter.

A horizontal section taken through the tapering mid portion of electrode members 49 is substantially elliptical in form (see Figure 7) so that as the electrode members are conveyed around their circuit by the rapidly driven metallic belt 47, there is a minimum disturbance of the ambient air due to the stream-line construction of the electrode members. The disturbance of the air, due to the rapid passage of belt 47 and associated electrode members 49 through it, is further minimized by the well rounded off upper portions 49ª of various electrode members and the electrode members ending in the pointed tip portions 49ᶜ.

The advantages of this construction, in which there is realized a minimum disturbance of the ambient air, will be pointed out hereinafter in considering certain electrical effects realized adjacent the electrode members.

The electrode members 50 associated with the metallic drive belt 48 are of similar construction to the electrode members 49 associated with belt member 47, as more particularly described above, but instead of having trailing tip end portions lying off to the left of the main body portion, as seen in Figure 6, the trailing tip end portions lie off to the right of the main body portion so as to achieve the stream-line effect with the opposite direction of the belt member 48. Likewise the total number of electrode members associated with belt 48 and the spacing between members is consistent with the total number of electrode members and spacing between members associated with the drive belt 47.

It may at this point be noted that upon energization of the drive motor 40, the various electrode members 50 travel clockwise in a plane spaced above the conveyor belt 17 and preferably substantially parallel therewith. The path of travel includes the straight-line portion from the lower belt side 17ª, as seen in Figure 2, diagonally across the belt in a left-hand direction to the upper belt side 17ᵇ, and another straight-line portion substantially parallel to the first from the upper belt side diagonally downwardly in a right-hand direction to the lower belt side. Similarly the electrode members 49 associated with the drive belt 47 move in a counter-clockwise direction in a plane spaced from the conveyor belt 17. Motion along the prescribed path includes straight-line travel downwardly across conveyor belt 17 from right to left, as seen in Figure 2, and a substantially parallel path of travel upwardly across the conveyor belt in a left to right direction.

The extreme tip portions of electrode members 49 and 50 preferably lie in a common plane spaced above and parallel to that of the upper surface of conveyor belt 17. Thus, illustratively, the paths of travel for the extreme tip portions of the electrode members include a movement across the conveyor belt and back along one diagonal for the electrode members 50, and a movement across the conveyor belt and back along an opposite diagonal for the electrode members 49.

Looking along the belt 17 in the direction of motion, as seen from the left in Figure 2, the first electrode members encountered move in a direction forming an obtuse angle lying off to the right with the direction of motion of the conveyor belt. The second group of electrode members encountered move in a direction forming an acute angle with the direction of motion of the conveyor belt lying off to left. The next group of electrode members encountered move across the conveyor belt in such a direction as to form an obtuse angle with the direction of motion of the conveyor belt, which is seen to lie off to the left of the direction of motion, while the angle formed by the motion of the last group of electrode members with respect to the direction of motion of the conveyor belt is acute and lies off to the right. Thus, the article or product as it is moved along the conveyor by means of the conveyor belt passes beneath two groups of rapidly moving electrode members (see Figures 1 and 2) moving diagonally back and forth across the conveyor belt along opposite diagonals, all as more particularly set forth above. Some of the peculiar advantages of this construction are pointed out more fully hereinafter in considering certain electrical actions and coactions with other parts of the apparatus described hereinafter.

As above pointed out, the various electrode members, metallic supporting and drive belts for the electrode members, pulleys, shafts, bearings, channel members, and the like comprising the electrode structure generally shown at 30, are preferably of metal to give a rugged and compact construction and at the same time to afford a path of low electrical resistance between the various cooperating members.

High potential electrical energy is supplied to the electrode structure 30, in a manner to be described more fully hereinafter, in order that the electrode structure may be maintained at a high potential, illustratively 150,000 volts with respect to ground.

The electrode structure 30 is mechanically supported and effectively insulated from the ground by means of the supporting members 52 and 53. Each of the supporting members 52 and 53 include the D-shaped insulating members, illustratively two, 54—55 and 56—57 respectively which are preferably made of a material such as dielecto or laminated bakelite having high electrical resistance characteristics coupled with mechanical rigidity and strength.

These various D-shaped members are preferably of such dimensions that their long straight sides, illustratively side 57ª for the member 57 (see Figure 3) are somewhat greater than the distance between the parallel spaced channel iron sections 31 and 32.

The various insulating supporting members 54 and 55 associated with support 52, and 56 and 57 associated with support 53 are preferably mounted on the channel iron sections 31 and 32 crosswise or at right angles to these members to give a compact construction, which at the same time is rigid and well adapted to withstand either lateral and/or longitudinal displacement of the electrode structure 30.

The insulating supporting members 54 and 55 are preferably secured to the parallel channel iron sections 31 and 32 by suitable attachment blocks 58 and 59 which are mounted on channel iron sections 31 and 32 respectively. To effect a compact construction, the attachment blocks 58 and 59 lie interiorly and exteriorly (with respect to the complete electrode structure generally shown at 30) of the thrust bearing members 33 and 37 associated with pulley members 43 and 45. Mounting of attachment blocks to their respective channel iron members is preferably effected by means of suitable screws or bolts 60 which pass through lower stepped portions 58ª and 58ᵇ and 59ª and 59ᵇ for the respective blocks 58 and 59.

The attachment blocks are slotted as at 58ᶜ and 58ᵈ for the block 58, and 59ᶜ and 59ᵈ for the block 59 in a direction at right angles to the length of the channel iron members to snugly receive the straight-side portions of the insulating supporting members 54 and 55 and maintain them in spaced parallel relation.

The insulating supporting members 54 and 55 are maintained in mechanical engagement with the attachment blocks 58 and 59 by means of suitable holding plates 58ᵉ and 59ᵉ which fit over the top surfaces of the attachment blocks 58 and 59 respectively and are fastened thereto by means of suitable screws or bolts 61.

The depths of the various slotted portions of the adjustment blocks are preferably such as compared to the height of the straight-side portions of the insulating supporting members that the holding plates firmly contact the upper edges of these portions of the supporting members so as to maintain a firm and rigid mechanical connection between supporting members and attachment blocks.

Similarly the insulating supporting members 56 and 57 are secured to the opposite ends of channel iron sections 31 and 32 by means of similar attachment blocks 62 and 63 respectively fastened to channel iron members 31 and 32 by suitable screws or bolts 60.

Analogous to the positioning of attachment blocks 58 and 59 on respective channel iron members 31 and 32 interiorly of and exteriorly of thrust bearings 33 and 37 respectively, the attachment blocks 62 and 63 are mounted on channel iron members 31 and 32 interiorly of and exteriorly of thrust bearing 34 and drive motor 40 respectively.

The insulating supporting members 54 and 55 are secured at their upper mid portions to a supporting bracket 64 which is preferably slotted as at 64ª and 64ᵇ to snugly receive the upper portions of the supporting members 54 and 55. A firm mechanical engagement is maintained by means of holding plate 64ᶜ secured to the bracket 64 by means of a suitable screw 65.

Similarly the insulating supporting members 56 and 57 are fastened to the supporting bracket 66 which is slotted as at 66ª and 66ᵇ to snugly receive the upper mid sections of 56 and 57 respectively, firm engagement being assured by holding plate 66ᶜ and its associated holding screw 65.

The supporting brackets 64 and 66 are preferably offset as at 64ᵈ and 66ᵈ (see Figure 1). The offset portions are preferably threaded to receive the vertical threaded shafts or screws 67 and 68 respectively, the upper portions of which are suitably journaled in brackets 69 and 70 respectively forming part of the general overhead frame structure (not shown).

To the upper ends of threaded shafts 67 and 68 are suitably fastened the bevel gears 71 and 72 respectively with which co-act bevel gears 73 and 74 suitably fastened to a horizontal shaft 75, the ends of which are preferably journaled in the supporting brackets 69 and 70. One end of the horizontal shaft 75 is provided with a suitable hand-wheel 76 by which a rotation may be imparted to the shaft to effect a rotation of the vertical threaded shafts or elevation screws 67 and 68.

Upon manipulation of hand-wheel 76, as for example, in a clockwise direction as seen from the left of Figure 1, the bevel gears 73 and 74 are rotated and impart a clockwise rotation (looking down on the gears as seen in Figure 1) to their co-acting gears 71 and 72 respectively giving a clockwise rotation to elevation screws 67 and 68 which, as a result of the threaded engagement with supporting brackets 64 and 66 respectively serve to raise the electrode structure 30 through the various insulating supports 54, 55, 56 and 57. Conversely a counter-clockwise rotation of hand-wheel 76 effects in an analogous manner a lowering of the electrode structure 30.

As above-mentioned, the electrode structure 30 is preferably maintained at a high electrical potential with respect to ground, illustratively 150,000 volts. The supporting brackets 64 and 66 with their associated elevation screws 67 and 68 respectively as well as the brackets 69 and 70, forming part of the general supporting frame (not shown), are preferably maintained at a ground potential for reasons of safety and economy of construction. Thus there is a difference in potential of 150,000 volts between the electrode structure 30 and the supporting brackets 64 and 66.

The insulating supporting members 54—55 and 56—57 which mechanically support the electrode structure from bracket 64 and 66 respectively are thus subjected to and must withstand the full value of the high potential, illustratively 150,000 volts.

To give a construction of the supporting members which combines rigidity and strength with compactness in form, and yet which at the same time is able to withstand the high potential differences between its lower and upper ends, the various insulating supporting members 54, 55, 56 and 57 are preferably D-shaped in form, as set forth above.

Referring now more particularly to Figure 3, the insulating supporting member 57 is shown in supporting relation with respect to the electrode structure 30 maintained at high potential and the supporting bracket 66 maintained at ground potential. Any possible electrical leakage along the surface of the insulating supporting member 57 (due to the high potential difference between electrode structure 30 and supporting bracket 66) would have to proceed from the attachment block 62 along the curved path of the right-hand arm 57$^b$, as seen in Figure 3, passing through such points as o—p—q and along a similarly curved path of the left-hand arm 57$^c$ of support 57 for any possible electrical leakage proceeding from the attachment block 63. It is to be noted that the leakage paths along the curved arms of the supporting member are of much greater length than the straight-line vertical distance between attachment blocks and supporting bracket. Thus, for a curved insulating support of such length as to adequately insulate the electrode structure 30 from the grounded supporting bracket 66, there is effected an appreciable reduction in the over-all height of the apparatus by an amount substantially equal to the difference between the length of the surface leakage path o—p—q and the straight-line vertical distance between the members. Such a construction effects a saving of materials in manufacture, and a reduction in the space required for installation.

The electrode members 49 and 50 associated with the electrode structure 30, all of which are maintained at a high electrical potential with respect to ground by means of the supporting structure 52—53, are preferably driven in a manner more particularly pointed out above by means of an electric motor 40. Energization of the motor 40 is preferably effected by connecting it to a suitable source of current 77, illustratively single phase alternating current, 60 cycles, 220 volts.

One of the terminals 40$^a$ of the motor 40 is connected by way of conductor 78 to the supporting channel iron member 32 as shown at 32$^a$, while the other motor terminal 40$^b$ is connected by way of conductor 79 to one end of the secondary transformer winding 80$^a$ associated with the insulating transformer 80 conveniently of a 1:1 transformer ratio. The circuit including motor 40 is completed by way of conductor 81 which connects the other end of transformer winding 80$^a$ to the channel iron member 32 as shown at 32$^b$.

Electrical energy is supplied to the secondary winding 80$^a$ as a result of its transformer relation with respect to the primary winding 80$^b$ which is directly connected by way of conductors 82 and 83 with the source of electrical energy 77.

As above-mentioned, the electrode structure 30 with its associated parts including channel iron member 32 and motor 40 are preferably maintained at a high potential with respect to ground. For reasons of safety and economy, one side of the relatively low potential source of electrical energy 77 is preferably maintained at ground potential, while the other side is at a potential difference therefrom, illustratively 220 volts. Thus, while the secondary transformer winding 80$^a$ is maintained at a potential of 150,000 volts, its associated primary winding 80$^b$ is maintained substantially at ground potential. The primary and secondary windings, therefore, need be insulated from each other in a manner to adequately withstand this great difference in potential. The details of this construction are not dealt with since they do not per se form part of the invention described herein.

Thus the electrode structure 30 is supplied with driving energy from a suitable source of power and at the same time is effectively insulated therefrom. The various electrode members 49 and 50 are driven in their prescribed paths back and forth across the conveyor belt 17, all in a manner more particularly set forth above, upon supplying the drive motor 40 with electrical driving energy from the source 77.

Positioned beneath the conveyor belt 17 and preferably in substantial alignment with the projection of the straight-line portion of the paths traced by the various electrode members 49 and 50, are the elongated electronic conduction devices 84—85 and 86—87 (see Figures 1 and 2). These various electronic conduction devices are preferably of a length substantially equal to the straight-line diagonal paths traced across the conveyor belt 17 by the electrode members 49 and 50 as they are driven back and forth in the manner more particularly described above.

The electronic devices are preferably supported in spaced relation beneath the conveyor belt 17 and the horizontal belt supporting member 27 forming a part of the conveyor supporting structure 23 by means of suitable blocks 88 and 89 for the electronic devices 84 and 85, and 90 and 91 for the electronic devices 86 and 87 (see Figure 4). These various supporting blocks are preferably fastened to the conveyor supporting frame sides 28 and 29 in any suitable manner as by means of screws or bolts.

The brackets 89 and 90 for the left-hand ends of electronic devices 84—85 and 86—87, as seen from the left of Figure 4, are niched as at 89$^a$ and 89$^b$ for the bracket 89, and at 90$^a$ and 90$^b$ for the bracket 90, so as to snugly receive the ends of the electronic devices 84—85 and 86—87 respectively.

The upper surfaces of brackets 89 and 90 (see Figure 5) are referably spaced sufficiently from the lower surface of the insulating angle beam 25 of the conveyor belt supporting structure 23 so that the various electronic conduction devices may be conveniently received within the niched portions of the insulating supporting brackets and conveniently removed therefrom for purposes of inspection, replacement or the like.

Similarly the right-hand ends of electronic conduction devices 84—85 and 86—87, as seen from the left of Figure 1, are respectively supported by similar insulating brackets 88 and 91 suitably spaced along the conveyor belt supporting side member 29 and fastened thereto as by means of screws or bolts. Thus the electronic devices are maintained in a plane substantially parallel to that of the upper surface of the conveyor belt 17 and to that of the extreme tip portions of the movable electrode members 49 and 50.

Furthermore the electronic devices 84 and 85 are substantially parallel and extend diagonally across the projection of the straight-line paths traced by the extreme tip portions of electrode members 49. Likewise the electronic devices 86 and 87 are substantially parallel and extend diagonally across the projection of the conveyor belt in an opposite sense to devices 84—85. Similarly they lie in substantial alignment with the projection of the straight-line paths of travel traced by the extreme tip portions of the electrode members 50. With the electronic devices horizontally mounted in a plane substantially parallel to that of the upper surface of the conveyor belt supporting structure, a maximum compactness of construction is achieved. Thus there is provided a greater space for other parts of my apparatus co-acting with the electronic devices, as will more fully appear hereinafter, permitting generally a more compact construction and a possible reduction in the height of conveyor and in the over-all height of the apparatus.

Furthermore, the mounting of the electronic devices beneath the upper part of the conveyor belt supporting structure and between its downwardly extending side portions assures protection for the electronic devices against possible damage during adjustment of the apparatus or against possible dislocation as a result of shocks, vibrations, or the like encountered in actual use.

The electronic conduction devices or gaseous conduction devices preferably include an elongated substantially cylindrical tubular member 92 (see Figure 9) which is preferably made of glass in the form of a thick walled vessel into one end of which is sealed, in any suitable manner an electrode member 93 with its associated conductor 94. The vessel is then exhausted at the other end and filled with a suitable inert gas, such as neon at a reduced pressure and sealed off as at 92ª. The various electronic devices coact with the electrode members and certain other parts of the apparatus in a manner to be more fully described hereinafter, which is productive of many highly important advantages as will later appear.

Referring now to Figure 1, there are spaced beneath electronic devices 84—85 and 86—87 the flat rectangular conducting plate-like members 95 and 96 respectively which form parts of parallel electrical condensers, as will more fully appear. These plate-like members are preferably of a width adapted to be received between the downwardly extending side portions 28 and 29 of the belt supporting structure 23 (see Figure 3) and of a length substantially equal to the over-all length of a group of parallel electronic devices taken in a direction along the conveyor belt.

The plate-like members 95 and 96 are supported in their respective positions immediately beneath electronic devices 84—85 and 86—87 respectively by means of insulating supporting brackets 97 and 98 for the plate 95, and 99 and 100 for the plate 96 (see also Figure 3). The brackets are preferably formed of an insulating material such as dielecto, and are conveniently fastened to their associated side wall members 28 and 29 by means of screws or bolts.

The conducting plate 95 is preferably connected by way of conductors 101 and 102 with the electrodes associated with electronic conduction devices 84 and 85 respectively (see Figure 1). Similarly the conducting plate member 96 is connected by way of conductors 103 and 104 with the electrodes associated with electronic devices 86 and 87 respectively. Thus the plate member 95 is maintained at a common potential with electrodes of conduction devices 84 and 85, while the plate 96 is maintained at a common potential with the electrodes of the electronic devices 86 and 87.

Spaced beneath the upper conducting plates 95 and 96 is a single rectangular conducting plate 105 which is preferably of a width slightly greater than the conveyor belt supporting frame work 23 (see Figures 3 and 4) and of a length substantially equal to the distance between opposite ends of upper plate members 95 and 96 taken in a direction along the conveyor belt (see Figure 1). The lower plate 105 forms with plates 95 and 96, two electrical condensers. The lower plate 105 is preferably supported in a plane substantially parallel with the upper plates 95 and 96 by means of the elevation screws 106 and 107 suitably journaled in projecting portions 11ª and 12ª respectively of the upstanding supports 11 and 12. The elevation screws 106 and 107 threadedly engage supporting arms 108 and 109 respectively associated with the lower condenser plate 105.

The lower ends of elevation screws 106 and 107 are provided with bevel gears 110 and 111 respectively, which are fastened thereto in any suitable fashion as by means of pins or set screws, with which are associated the respective bevel gears 112 and 113 suitably mounted on a horizontally extending shaft 114, the ends of which are suitably journaled within the lower base portions of the upstanding supports 11 and 12.

Manipulation of the handwheel 115, preferably mounted on horizontal shaft 114, for example, in a clockwise direction as seen from the left in Figure 1, acting through shaft 114 and bevel gears 112—110 and 113—111 and the elevation screws 106 and 107, serves to lower the position of plate 105, increase the spacing between upper plates 95—96 and 105 and consequently decrease the capacities of condensers 95—105 and 96—105. Conversely manipulation of handwheel 115 in a counter-clockwise direction causes, in an analogous manner, an increase in the capacities of the electrical condensers 95—105 and 96—105.

The lower condenser plate 105 is preferably connected to ground by way of conductor 116. Thus, from the electrode structure 30 maintained at a high electrical potential with respect to ground, there are provided parallel discharge paths, the left-hand one, as seen in Figure 1, including electrode members 49, electronic conduction devices 84—85, conductors 101—102, upper condenser plate 95, lower condenser plate 105, and conductor 116 to ground; the right-hand path includes electrode members 50, conduction devices 86—87, conductors 103—104, upper condenser plate 96, lower condenser plate 105 and conductor 116 to ground.

Between the electrode structure 30 and ground and consequently across the above-mentioned parallel paths of discharge, there is connected a source of high electrical potential, illustratively 150,000 volts at a relatively high frequency, such as 640 cycles per second. There is shown at 117 a suitable source of electrical energy, illustratively 640 cycle alternating current at 550 volts which is connected by way of suitable conductors 118 and 119 to the primary winding 120ª of the high potential transformer 120.

The high potential secondary winding 120ᵇ or the transformer has one end connected by way of conductor 121 to ground, while the other end is connected by way of conductor 122 to the electrode structure 30 mechanically and electrically secured thereto as at 32ᶜ. Since the high potential supply circuit and apparatus per se is not claimed in this application, their detailed construction will not be dealt with herein; the construction of the transformer, however, is such that the desired voltage transformation, illustratively 550 volts to 150,000 volts is achieved.

It is to be understood, however, that the specific frequency of 640 cycles and the high potential of 150,000 volts are not to be treated by way of limitation since these factors together with the number and spacing of electrode members, the speed of the electrode members along their paths of travel, as well as the rate of motion of the conveyor belt, the distance between electrode members and belt, capacities of the condensers, the kind and quality of product to be treated, and the form in which it is put up, are all appropriately proportioned with respect to each other.

The various figures above set forth may be considered illustrative where the material to be treated is, for example, corn-meal that is put up in packages of say 6 inches by 4 inches by 2 inches. In treatment the packages are laid flat on the conveyor belt giving a height of 2 inches or a thickness of material of substantially 2 inches. Under these conditions the extreme tip portions of the electrode members lie in a plane spaced about ⅜ inch above upper surfaces of the packages C which are being moved along the conveyor, as shown in Figure 1. Where it is desired to use a higher conveyor belt speed, the number and speed of the electrode members may be increased.

Assuming first, however, a condition where no packages are being moved along the conveyor and consequently where there is a free space between the extreme tip portions of the various electrode members and the upper surface of the conveyor belt 17, there are, as above pointed out, equivalent parallel circuits across which the high potential electrical energy is applied. Since these parallel circuits are analogous in construction and operation, the electrical actions taking place in the one or left-hand branch, as seen in Figure 1, will now be considered in detail.

As a result of the high potential applied to the electrode members and further as a result of the relatively sharp extreme tip portions of these electrode members (assuming a proper spacing of the electrode members 49 above the conveyor belt 17 controlled, as above-mentioned, by means of handwheel 76, and a proper relative capacity value of the condenser 95—105 controlled by manipulation of handwheel 115), the air immediately adjacent the tips of the electrode members is subjected to high electrostatic stresses causing localized rupture of the air with the consequent production of many fine corona streamers extending downwardly from the lower tip portions of the electrode members and spreading out toward the conveyor belt terminating at the belt supporting member 27 associated with the conveyor support 23.

Thus the air between the extreme tip portions of the electrode members and the upper surface of the horizontally extending conveyor belt supporting member 27 is conducting and in effect a conductor contacting the conveyor supporting structure.

Considering now the electronic devices 84 and 85 spaced beneath the conveyor belt, it is to be noted that they are included in the electrostatic field beneath the electrode members 49. Due to the difference in potential of their main body portions including the relatively thick walled glass envelopes and their enclosed gas, illustratively neon at a pressure of 6 millimeters of mercury, and their electrodes maintained at a potential corresponding to the condenser plate 95, the enclosed gas becomes ionized; the devices becoming in effect parallel conductors. The ionized gas paths of the electronic conduction devices, extending (see Figure 2) underneath the rows of electrodes, furnish a low reluctance or low impedance path for the flux emanating from the electrodes and draw such flux inwardly and concentrate it, producing a field of greater intensity in the treatment zone and one of more uniform current density. Thus straying flux and a lowering of efficiency are negatived.

Extending downwardly from the electrode members immediately above the electronic conduction device 84 there are individual fields each starting from the extreme tip portions of these electrode members in the form of corona streamers which tend to tuft or fan out toward the belt but this tendency is reduced to a great extent as above-mentioned as a result of the ionization of the electronic devices, the region of relatively high current density continuing downwardly and terminating on the electronic device 84.

As above-mentioned, the walls of the electronic devices are made of relatively thick glass so that they can adequately withstand the comparatively high potentials without cracking or breaking under conditions of constant duty over long periods of time.

Local rupture of the air adjacent the electronic devices is effectively prevented as a result of the relatively thick wall of the device and further as a result of the continuous interior surface of the wall which determines the shape of the ionized gas column; a glazed interior surface assures a freedom from sharp conducting points from which corona streamers might form. The intervening dielectric between the effective upper and lower plates is composite in nature and includes the conveyor belt 17, the upper supporting portion of the conveyor belt supporting structure 23, the thick walled glass envelope in addition to the intervening layers of air. Similarly between the corona tufts projecting downwardly from those electrode members 49 spaced above the electronic device 85 there is formed in effect a condenser with the ionized gas column of the electronic device 85.

These two effective condensers are electrically connected in parallel between the electrode structure 30 and the upper plate 95 of the variable condenser 95—105. Thus in the left-half branch of the high potential load circuit for the electrode members 49, there are the two electrically parallel effective condensers including the electronic devices 84 and 85, as pointed out above, and the variable condenser 95—105.

The applied electrical potential, illustratively 150,000 volts, therefore, distributes itself in a drop of approximately 75,000 volts in the region of corona discharge between the electrode members and the conveyor belt; about 37,000 volts across the effective parallel condensers including the electronic devices 84 and 85, as mentioned above;

a relatively small drop of about 500 volts in the electronic devices themselves, and a drop of about 37,500 volts across the variable condenser 95—105.

Although the mean value of the voltage gradient in the region between the tip portions of the electrode members and the upper surface of the conveyor belt supporting structure is sufficiently high that the intervening air ruptures locally giving rise to many fine corona streamers as above set forth, the effective condensers and the variable condenser have sufficient dielectric strength to prevent local rupture and breakdown. In fact, the effective condensers are so proportioned (as measured by the distance between the upper surface of the conveyor belt supporting member and the electronic devices) and the variable condenser 95—105 is so proportioned that this series-parallel combination of capacities is able to withstand the full value of the high potential electrical energy.

Similarly with the right-hand branch of the main electrical circuit including the electrode members 50, there are formed zones of highly stressed air space filled with corona streamers forming effective conductors, the lower ends of which cooperate with gaseous conduction devices 86—87 to form effective condensers which are connected in series with the variable condenser 96—105. Substantially identical values of potential drops occur across these corresponding regions since the two branches are of like construction.

In a like manner the effective condensers (electrically connected in parallel) and the serially-connected variable condenser 96—105 are proportioned to withstand the full value of the high potential electrical energy. Thus even under extreme conditions where, for example, the drop across the air space between tip portions of the electrode members and the conveyor belt supporting structure or any part of it is reduced to zero as a result of certain extreme operating conditions, more fully dealt with hereinafter, the current in the circuit is limited to a safe operating value.

Considering now with greater particularity the region between the tip portions of the electrode members and the upper surface of the conveyor belt supporting structure to be hereinafter referred to as the treating zone or zones of treatment, attention is directed to Figure 6. It is to be noted that the electrode member there shown includes a tip portion, the end surface of which gradually curves more and more in a trailing direction until the extreme tip portion is reached.

With the electrode member properly mounted to its metallic driving belt in a vertical position substantially as shown in Figure 6, the vertical distance between an assumed point in space X immediately beneath the path of the electrode members gradually diminishes from a time when the leading edge of the electrode member is directly above the point until the extreme tip portion 49c is directly above the point. During this time the dielectric stresses of the ambient air about the point increase in value until local rupture occurs with the consequent formation of corona streamers. Illustratively the commencement of this local rupture at the point X occurs when a point 49e of the electrode member 49 is directly above the point X.

As the electrode member 49 continues in its motion from left to right as indicated, the point X is subjected to greater and greater dielectric stress, the rupture of the air adjacent the point becomes more pronounced, and upon further movement of the electrode member the extreme tip portion 49c is spaced directly above the point X where a complete rupture takes place accompanied by a rendering of the region immediately adjacent the point X comparatively conductive.

Attendant the commencement of the rupturing effect and rapidly increasing until a complete rupture is realized, corona streamers project downwardly from the tip portion of the electrode member toward the point X. Thus a point X in the air space immediately beneath the path of electrode travel is broken down and rendered electrically conductive, the action commencing immediately before the extreme tip portion of the electrode member passes above the point and rapidly progressing until a complete breakdown is realized when the extreme tip portion is immediately above the assumed point.

Viewed differently an electrostatic field projects downwardly from the lower surface of the tip portion of the electrode member, the intensity of which is greatest adjacent the extreme tip portion and of a slightly lesser value at points more remote from the extreme tip. Thus, associated with each electrode member there is an electrostatic field which for analytical purposes may be considered as moving along with the electrode member.

The stream-line construction of the various electrode members aid materially in the production of fields of substantially uniform intensity projecting downwardly from the various electrode members. As above-mentioned, a stream-line construction of the electrode members allows them to be driven at a high rate of speed in prescribed paths above the conveyor belt with a minimum disturbance of the ambient air. Thus rarefied regions along the trailing edge of the electrode members which tend to local rupture and consequent corona formation within these regions at lower values of the electrostatic stress, are effectively prevented.

Upon the electronic devices associated with the straight-line portions of the paths of the electrode members being rendered conductive, in a manner more particularly set forth above, there is a partial collapse of the individual fields projecting downwardly from each electrode member, taken in a direction crosswise of the various electronic devices, due to the localized region of greater electrical conductivity presented by the section taken through any one of the electronic devices. The various fields then taken in this direction crosswise of the particular electronic device with which they are associated becomes of a more uniform current density. In a direction taken along the lengths of the electronic devices, the various fields tend to fan out, as a result of the highly conductive path thus provided.

As a result of the partial collapse of the electrostatic fields due to the electronic conduction devices with which they are associated, taken in a direction crosswise of these devices and a slight spread taken in the direction lengthwise of the devices, the cross-section of any one field taken at various points along the length of the field is substantially equal. Thus, the average current density taken at various points along the length of the field or at various points from the extreme tip portions of the electrode members due to the upper surface of the conveyor belt supporting structure is substantially constant.

Thus there are provided electrostatic fields of substantially uniform current density taken in a direction along the length of the belt as well as in a direction crosswise of the field. The advantages of the use of a field of uniform intensity in the treatment or sterilization of products will appear more fully hereinafter.

The various above-mentioned fan-shaped fields remain substantially constant in form as the electrode members travel along the straight-line portion of their prescribed paths due to the comparatively uniform conductive characteristics of any one electronic device (neglecting for purposes of analysis the relatively small difference in potential drop as between one end of the electronic device and its associated electrode, and the other end of the electronic device and the electrode).

Thus in effect there are provided illustratively four, or more particularly, two pairs of parallel treating zones extending crosswise of the conveyor belt 17 in diagonally opposite directions, each path being traversed at any one particular instant by a number of fan-shaped fields moving edgewise at a high rate of speed, illustratively 4,000 feet per minute.

Preferably the number of electrode members associated with the straight-line portion of the path immediately above any one electronic device is such as compared with the length of the electronic device so that as one electrode member is just leaving a point immediately above one end of the electronic device, another electrode member is just entering a point immediately above the opposite end of the device. Thus, as one fan-shaped field is changing in form as it leaves the influence of the electronic device, another field is assuming the fan-shape as it comes within the influence of the electronic device. As a result there is maintained a substantially constant current flow between the electrode members and either one of their associated electronic conduction devices since this construction is preferably maintained throughout the four treating zones; the load on the high potential source of supply energy is maintained substantially constant.

It may at this point be noted that the intermediate sections of the conveying portion of the conveyor belt 17 are maintained at a relatively high potential, illustratively 75,000 volts, since the sections of the belt immediately beneath the straight-line portions of the paths of travel of the electrode members, or those portions through which the illustratively four treating zones pass, have suffered a drop of but 75,000 volts from the illustratively 150,000 volts applied.

Thus, the length of belt from the drum 15 (see Figure 1), which for reasons of safety is maintained at ground potential, to the first treating zone immediately beneath the electrode members 49 as they cooperate with the electronic conduction device 84, must be such as to adequately withstand this relatively great potential difference. Likewise the length of belt between the grounded drum 16 and the nearest treating zone beneath electrode members 50 must be substantially equal to that of the part adjacent to drum 15. For cotton or asbestos conveyor belts a distance of a few feet from either drum to the nearest treating zone is conveniently used for the illustrative figures set forth above.

With the treatment zones, illustratively four, established, as above-mentioned, prior to the introduction therein of the products to be treated, the alteration or readjustment of any one zone upon the introduction into it of, for example, a packaged product will now be considered.

The packaged product taken in the direction of the field, or in a direction perpendicular to the upper surface of the conveyor belt, includes an upper layer, illustratively of paste-board or heavy paper forming a wall of the package or carton, the relatively thick layer of the product to be treated, illustratively corn-meal, and a lower layer of paste-board or heavy paper forming an opposite side wall of the carton.

The average permittivity of container and product, taken in the direction indicated, is appreciably greater than the permittivity of the air space which it displaces. Therefore, there is a proportionate reduction in the potential drop across this part of the treatment zone. The air space immediately above the product ruptures substantially as before when the potential gradient has reached the proper value. This, however, occurs at a lower applied potential due to the reduction in the impedance of that portion of the treatment zone, or for the assumed 640 cycle high voltage supply, at a lower point on the voltage wave.

For a complete line of packaged product undergoing treatment there is an appreciable change in the impedance of all of the treatment zones and a consequent redistribution of the potentials in the high voltage load circuit accompanied by a slight increase in the total load current. Under these conditions the effective condensers, or the capacities between the lowermost portions of the corona discharge and their respective associated electronic conduction devices, and the variable condensers effectively limit the total load current to a desired operating value.

Considering now the voltage distribution through the packaged product in greater detail, it is to be noted that the upper layer of paste-board or heavy paper of the package or carton has a permittivity that is somewhat higher than the air. Likewise the permittivity of the lower layer of the paste-board forming the lower surface of the container is somewhat higher than the layer of air that it displaces. The intervening relatively thick layer of product undergoing treatment is of a heterogeneous nature comprising small particles of illustratively corn-meal having a permittivity considerably higher than air, insects and/or their eggs, larvae and pupae having a permittivity greatly in excess of air and in fact highly conductive, and finally the great many small air spaces between the particles of the infested material.

Between the upper and lower surfaces of the package or carton with its enclosed product there is a redistribution of the potential drop so that the potential applied across the upper and lower side walls of the carton is insufficient to break down these carton walls causing puncture or burning. Similarly the redistribution of the potential applied across the layer of product undergoing treatment is not so great, and particularly the potentials applied across individual particles of the product are not so great, as to break down the product and cause it to char or burn. In fact the distribution of potential applied across the various particles of the product are such that the particles suffer no harmful effects whatsoever as they undergo treatment.

The minute air spaces representing the interstices between the various particles of product are, however, subjected to a potential gradient sufficient to rupture them giving rise to corona formation completely inter-penetrating the product.

The insect life, since it is a comparatively good conductor of electricity, affords a path of exceedingly low resistance as compared with the particles of food product so that the corona streamers pursuing a path of least resistance in effect seek out the insect life. The current density within the insect life rises to a relatively high value, due to its high conductivity, and as a result of the high current density the life of the insects and/or their eggs, larvae or pupae is extinguished.

A substantially uniform current density of the rapidly moving fan-shaped electrostatic fields, the uniformity of which is greatly increased by means of the electronic devices, in a manner more particularly set forth above, assures a uniform and thorough treatment of the product. A relative high frequency of the applied electrical energy, illustratively 640 cycles, materially aids in the complete destruction of insect life in subjecting it to a great many shocks in very rapid succession, the shock effect of which is materially increased by the steep wave front characteristics of the high frequency electrical energy.

In the above discussion concerning the establishment of the treatment zones and their respective readjustments effected upon entry of the product to be treated, it was assumed that the spacing of the electrode members above the conveyor belt was such as compared with the spacing between conveyor belt and the electronic devices, the spacing between the plates of the variable condensers, and the characteristics of the applied high potential, that many fine corona streamers were projecting downwardly toward the conveyor belt from the tip portions of the electrode members prior to the introduction of the product into the zone thus formed.

I may, however, change the spacing between the plates of the variable condensers 95—105 and 96—105 as by manipulating the handwheel 115 in a manner more particularly described above so as to decrease the capacity of these condensers and increase the proportionate voltage drop across their terminals. Then for a constant setting of the electrode structure 30, and more particularly for a constant setting of the electrode members 49 and 50 above the conveyor belt 17 a condition may be attained where corona streamers no longer fill the space between the tip portions of the various electrode members and the conveyor belt. The potential gradient in these regions is but just insufficient to cause local rupture of the air space and consequent corona formation.

Under these conditions, the entry of the product to be treated into the space between electrode members and conveyor belt causes a sufficient reduction in the impedance of this part of the high potential circuit with a consequent readjustment of the potential drops so that the potential gradient within the region rises to a value sufficient to cause local rupture of the air and formation of corona within the product as well as above it, the distribution of which is more particularly described above.

Although thorough treatment of the product may be effected with the apparatus so set that corona formation is just about to take place with the consequent establishing of the above-mentioned treatment zones, I preferably set the apparatus so that corona formation is already taking place and the treatment zones already established, all as more particularly set forth above, prior to the introduction of the product into the zones of treatment. With the apparatus so set there is less change in the total impedance of the high potential circuit with consequent improved regulation and higher operating efficiency.

As above-mentioned, there are established illustratively four treating zones into which the products or articles to be treated are successively conveyed. Illustratively the first of these zones comprises a number of intense electrostatic fields driven diagonally across the path of travel in a direction from left to right and toward the direction of approach, while the second zone comprises a number of similar fields moving diagonally across the path of travel from right to left along the direction of travel; the paths of travel of these two zones with respect to the conveyor belt are diagrammatically shown at D and E respectively in Figure 10.

Similarly the third and fourth treating zones include intense electrostatic fields moving diagonally across the conveyor belt in directions illustratively from right to left and from left to right respectively, and respectively toward and away from the approaching product as diagrammatically shown at F and G respectively of Figure 11.

The advantages derived from the use of illustratively four treating zones moving from left to right and from right to left across the conveyor along one pair of parallel diagonals, and from right to left and from left to right along an opposite pair of parallel diagonals will appear in considering certain actions that take place when the product is undergoing treatment.

Referring now to Figure 10, there is shown at $C^1$ a package containing material to be treated, illustratively corn-meal, which is moving in a direction from left to right and the forward or entering edge has just entered the first treatment zone D diagrammatically shown by a series of arrows.

In view of what has been above set forth, it will be understood that the series of arrows represents a plan view of a number of individual intense electrostatic fields each made up of a great number of fine corona streamers moving across the conveyor belt at a high rate of speed in the direction indicated by the arrows.

Considering first the package $C^1$ at the particular instant shown in Figure 10, the fields of treatment are crossing the front portion of the package obliquely. Due to such factors as electrostatic flux refraction and reflection there is a tendency for the electrostatic flux to become concentrated on the approach portion of the side wall of the package or carton (which as above-mentioned is of a paste-board or heavy paper having dielectric characteristics) so that the approaching flux tends to persist along the wall where there is a slight delay in the progress of the field along the direction indicated.

The motion of the electrode member, the extreme tip portion of which is the source of the intense field or corona streamers, continues at a constant rate so that as a result the field stretches out or becomes attenuated and in fact may become instantaneously discontinuous to assume its intense homogeneous form at a point well inside the package spaced from the front wall or entering edge E. Thus, it is possible that a portion of the product immediately adjacent the entering wall of the container will not receive adequate treatment or sterilization.

Similarly as the package $C^1$ is moved further along toward the right, as seen in Figure 10, the left-hand side wall $l$ as seen from the left of Figure 10 looking along the direction of motion of the conveyor, tends to impede the progress of the fields across the product, or stated differently there is a tendency for the treating fields to persist along the outer surface of the wall that they approach with a consequent lack of treatment or at least incomplete treatment of the product immediately adjacent the wall $l$.

The package $C^1$ in passing through the first treatment zone D receives a complete sterilization or treatment in all parts except a region immediately adjacent the entering or front wall $e$ and along the left-hand side wall $l$, or in other words in all regions save those immediately adjacent the container walls which the rapidly moving fields approach in passing across and through the product.

As the product is further moved along by the conveyor belt into the second treating zone E, all parts of the product are subjected to treatment or sterilization except those portions that lie immediately adjacent the right-hand side wall $r$ and the rear or trailing end wall $t$.

Due to various electrical actions or reactions between the side wall of the container and the rapidly moving fields of treatment there is, as above-mentioned, an appreciable delay in the starting of the corona discharge through the product. In fact the particular electrode member from which the group of corona streamers project has moved an appreciable distance across the package before an adequate treating field is established within the product, all as more particularly set forth above. Thus there is an untreated region adjacent the right-hand side wall $r$ and the rear or trailing end wall $t$ of the packaged product which is shown in the position $C^2$ of Figure 10 after having passed the treatment zone E.

It is to be noted, however, that the regions inadequately treated in the first zone as at D or those regions immediately adjacent the entering or front end wall $e$ and the left-hand side wall $l$ receive thorough treatment by the oppositely moving fields of the treatment zone E. This is true except for the right-hand entering corner and the left-hand rear or trailing corner as seen looking along the direction of motion of the conveyor. These two regions represent over-lapping parts of the regions escaping treatment in the oppositely moving parallel zones D and E.

As the packaged product is further transported along the prescribed path by the conveyor it assumes a position $C^3$, as shown in Figure 11, where it is then subjected to the treatment zone F, and the product is given further treatment. The various fields in this zone are moved in a direction from right to left across the line of travel of the packaged product and toward the direction of approach. In passing through this zone the product receives treatment in all parts except those regions immediately adjacent the front or entering end wall $e$ and the right-hand side wall $r$.

Thus the left-hand, rear or trailing corner of the product which escaped treatment in the first and second zones receives full and adequate treatment along with all other portions of the product except the regions particularly noted above. The right-hand entering corner of the packaged product still remains untreated or at least incompletely treated.

Further movement of the product along the prescribed path brings it into a position $C^4$ as shown in Figure 11, where it is subjected to the action of the treatment zone G, the various fields of which are moved in a direction oppositely and substantially parallel to the zone F. The packaged product in passing through this field is subjected to thorough treatment in all parts except those regions immediately adjacent the left-hand side wall $l$ and the trailing or rear end wall $t$; these regions will escape treatment or receive incomplete treatment due to various electrical actions as more particularly outlined above. It is to be noted, however, that the part of the product which receives thorough treatment in this position includes the right-hand entering corner which has heretofore escaped treatment in the first three zones.

Thus by passing the product through two pair of diagonally opposite zones a thorough and complete treatment or sterilization of the product is effected in a reliable manner. Thus in spite of interference effects of the various vertical walls of the package or carton, a thorough treatment or sterilization of the product is assured.

Insofar as certain other features of my invention are concerned, thorough treatment of the product in, for example, a loose unpackaged form may be had without moving the treating fields along the diagonal paths described, or in fact, it is possible to obtain a reliable treatment under certain circumstances without moving the fields at all. However, by producing the treating zones above described, many practical advantages, such as safety, economy and reliability are achieved which are particularly important in a thorough treatment of food or other products put up in packaged form.

It may at this point be noted, for packages put up in substantially square or rectangular containers or cartons in which there is an angle of substantially 90° between the side walls and end walls, that the treatment zones lie at angles of approximately 45° with respect both to the side walls and end walls. As a result of the substantially equal angles at which the rapidly moving fields strike the vertical wall portions of the package, the regions of product adjacent these walls escaping treatment are of substantially equal depths; the depth value being at a minimum for both side and end walls at the above-mentioned angle of 45°. For angles above and below this value, the depths of untreated regions adjacent either side or end walls correspondingly increase and decrease or decrease and increase respectively.

While for illustrative purposes the specific values of potential, electrode spacing above product, speed of the electrode members, and speed of the conveyor belt have been given for an assumed treatment of corn-meal put up in packages of 2 inches by 4 inches by 6 inches in dimension, it will be understood that these figures are not to be taken in a limiting sense.

For other products to be treated such, for example, as white flour put up in similar packages, similar values of the conveyor speed and speed of the electrode members, as well as spacing of the electrode members above the packaged product may be used. It is desirable, however, that in the sterilization of flour a higher electrical potential be made available in the treatment zone. This may be effected in any suitable manner as, for example, by controlling the potential at the source of supply 117 in any suitable manner (not shown) or by controlling the transformer ratio of the transformer 120 in any suitable manner (not shown). The control is preferably effected, however, by suitably adjusting the capacities of the variable condensers 95—105 and 96—105 as by increasing their capacities by proper manipulation of the handwheel 115 (see Figure 1) in a manner more particularly described above, thus decreasing the potential drop across these parts of the parallel high voltage load circuits and increasing the potential available for the treatment zones.

Where products are put up in other forms or sizes of cartons or containers, for example in a thicker type of carton, the height of the electrode structure above the conveyor belt, or more particularly the height of the extreme tip portions of the electrode members above the upper surface of the packaged products may be quickly adjusted by proper manipulation of the handwheel 76 (see Figure 1), all as more particularly set forth above.

It may at this point be noted that the handwheel 115 used in the adjustment of variable condensers 95—105 and 96—105, and the handwheel 76 associated with the electrode structure 30 are mechanically and electrically connected to the metal frame work which, as above noted, is electrically grounded. These handwheels, therefore, are always maintained at ground potential thus assuring a maximum safety of operation or control of the various operating parts during adjustment of the apparatus even when the electrode structure 30 is maintained at high potential and products are being treated. Thus a precise control under actual operating conditions may be readily had in a thoroughly practical manner.

For the example given, the electrode structure is raised so that the extreme tip portions of the electrode members move in a plane set at a predetermined distance above the upper surface of the packages.

Thus, I am enabled to meet the many varying conditions or requirements met with in actual practical use in a quick and dependable manner with minimum exertion and maximum safety.

It may at this point be noted that the use of the horizontally mounted electronic conduction devices 84, 85, 86 and 87 (preferably of such length as to extend completely across the path of the conveyor belt) assures a treatment zone of maximum width through which a maximum number of packages may be passed in side by side relation. Furthermore the mounting of the electronic devices as shown with one electronic device for each treatment zone to be established permits the use of a minimum number of the relatively expensive electronic conduction devices in the construction of the apparatus and a material saving in manufacturing cost as well as in the cost of maintenance.

Moreover as a result of the use of the electronic conduction devices, I am enabled to achieve as above-mentioned, highly efficient sterilization effects at a materially decreased high-voltage applied potential, thus decreasing the insulating difficulties and permitting efficient operation at reduced power and consequently at less operating expense.

The use of the electronic devices, in addition to the many advantages set forth above, in concentrating the fields of the various treatment zones prevent undue stray or leakage fluxes along the length of the conveyor belt and belt supporting structure, thus permitting a reduction in the over-all length of apparatus.

The use of an individual electronic conduction device associated with each of the treating zones has an additional advantage in that the individual effective condensers between the lower portion of the zones and the particular electronic device act as limiting factors in the load current to be handled by the various parts of the apparatus. Thus if, for example, a package of exceptionally high conductivity such as a water-soaked package was introduced into the treatment zones, the impedance of the particular zone into which the package moved would be greatly reduced or in fact the zone would be short-circuited. The capacity effect between the bottom of the package and electronic conduction device associated with the treatment zone would then materially aid in preventing the current through this branch of the circuit from rising to excessive or harmful values. In this latter connection the individual condensers 95—105 and 96—105 aid in the maintenance of the current at a safe value since but one of the condensers is in the circuit at any particular time, and its capacity is but one-half of that of both condensers connected in parallel.

It will thus be seen that there has been provided in this invention an art and apparatus in which the various objects hereinbefore set forth, together with many thoroughly practical advantages, are successfully achieved. It will be seen that the apparatus is of a compact and rugged construction, that it is highly dependable and efficient in operation, and that it is well adapted to meet the many varying requirements of actual practical use.

As many possible embodiments may be made of the mechanical features of the above invention, and as the art herein described might be varied in various parts all without departing from the scope of the invention, it is to be understood that all matter hereinbefore set forth or shown in the accompanying drawings is to be interpreted as illustrative and not in a limiting sense.

I claim as my invention:

1. In electrical sterilizing apparatus, in combination, a source of high potential; means forming a condenser connected across said source of potential, said means including an electrode structure having a plurality of discharge tips carried by a belt and means for driving said belt, said discharge tips moving in substantially a single plane and being maintained at high potential, and plate-like means spaced from said plane and with the intervening space partially filled with air, the remainder of said space being occupied by an elongated electronic conduction tube extending parallel to the path of movement of said tips in said plane; and means for passing a product to be treated in a path intervening said plane and said conduction tube.

2. In electrical sterilizing apparatus, in combination, a source of high potential; means forming a condenser connected across said source of potential, said means including an electrode structure having a plurality of discharge tips carried by a belt and means for driving said belt, said discharge tips moving in substantially a single plane and being maintained at high potential, and plate-like means spaced from said plane and with the intervening space partially filled with air, the remainder of said space being occupied by a plurality of electronic conduction tubes lying parallel to said plane, one of said tubes being aligned with the projection of one side of said belt and the other being aligned with the projection of the other side of said belt; and means for passing a product to be treated in a path in close proximity to said discharge tips and intervening the latter and said two conduction tubes.

3. In electrical sterilizing apparatus, in combination, a source of high potential; capacity-forming means connected thereto and including electrode means in the form of a belt carrying a plurality of discharge points moving in substantially a single plane when said belt is driven, and means for driving said belt, and plate-like means spaced away from said plane, the spacing therebetween including air as a dielectric; and means for passing a product to be sterilized through said space along a path sufficiently close to said discharge points to effect local rupture through the product but sufficiently spaced from said plate member to prevent complete breakdown between said discharge points and said plate member.

4. In electrical sterilizing apparatus, in combination, a source of high potential; capacity-forming means connected thereto and including electrode means in the form of a belt carrying a plurality of discharge points moving in substantially a single plane when said belt is driven, and means for driving said belt, and plate-like means spaced away from said plane, the spacing therebetween including air as a dielectric; means for passing a product to be sterilized through said space along a path sufficiently close to said discharge points to effect local rupture through the product but sufficiently spaced from said plate member to prevent complete breakdown between said discharge points and said plate member; and means interposed between said plate-like member and said path and aligned along the projection of at least one side of said belt for concentrating the dielectric flux emanating from said high potential discharge points.

5. In electrical sterilizing apparatus, in combination, a source of high potential; capacity-forming means connected thereto and including electrode means in the form of a belt carrying a plurality of discharge points moving in substantially a single plane when said belt is driven, and means for driving said belt, and plate-like means spaced away from said plane, the spacing therebetween including air as a dielectric; means for passing a product to be sterilized through said space along a path sufficiently close to said discharge points to effect local rupture through the product but sufficiently spaced from said plate member to prevent complete breakdown between said discharge point and said plate member; and an electronic conduction device that is elongated and positioned lengthwise along the projection of at least one side of said belt and positioned between said path and said plate-like member.

6. In electrical sterilizing apparatus, in combination, article-conveying means, elongated electronic conduction means positioned on one side of said conveying means, electrode means positioned on the opposite side of said conveying means and aligned lengthwise of said conduction means, and a source of high potential electrical energy having one side thereof connected to said gaseous conduction means and the other side thereof connected to said electrode means.

7. In electrical sterilizing apparatus, in combination, article-conveying means, elongated electronic conduction means positioned on one side of said conveying means transversely to the direction of motion of said conveying means, electrode means positioned on the opposite side of said conveying means and adapted to be moved lengthwise of said conduction means, and a source of high potential electrical energy connected to said gaseous conduction means and to said electrode means.

8. In electrical sterilizing apparatus, in combination, article-conveying means, a plurality of elongated gaseous conduction tubes positioned on one side of said conveying means at an angle inclined to the direction of motion thereof, electrode means positioned on the opposite side of said conveying means and having a path of movement lengthwise of said conduction means at a substantially constant spacing therefrom, and means for establishing a high electrical potential difference between said conduction means and said electrode means.

9. In electrical sterilizing apparatus, in combination, a conveyor belt, a plurality of elongated electronic conduction devices positioned beneath said belt, a corresponding plurality of cooperating electrode means positioned above said belt, means for moving said electrode means lengthwise of said conduction devices, and means for maintaining a high electrical potential difference between said conduction devices and said cooperating electrode means.

10. In electrical sterilizing apparatus, in combination, a conveyor belt, a plurality of elongated electronic conduction devices positioned beneath said belt in a plane substantially parallel thereto and having their longitudinal axes inclined to the direction of motion thereof, a corresponding plurality of cooperating electrode means spaced above said belt, means for moving certain of said electrode means lengthwise of certain of said conduction devices to traverse the belt in one direction and for moving other of said electrode means lengthwise of other of said conduction devices to traverse the belt in another direction, and means for maintaining a high electrical potential difference between said gaseous conduction devices and said cooperating electrode means.

11. In electrical sterilizing apparatus, in combination, article-conveying means, a pair of substantially parallel elongated electronic conduction means spaced from said conveying means and inclined to the direction of motion thereof, electrode means spaced from said conveying means on a side opposite said electronic conduction means, means for moving said electrode means lengthwise of one of said conduction means to cross said conveying means in one direction and lengthwise of the other of said electronic conduction means to cross said conveying means in a return direction, and means for maintaining a high electrical potential difference between said electronic conduction means and said electrode means.

12. In electrical sterilizing apparatus, in combination, article-conveying means, a plurality of pairs of spaced elongated electronic conduction means positioned on one side of said conveying means at oppositely inclined angles to the direction of motion thereof, a corresponding plurality of sets of electrode means positioned on the opposite side of said conveying means and adapted to cooperate with said electronic conduction means, means for moving the electrode means of one set lengthwise of one electronic conduction means of a pair and lengthwise but in reversed direction of the other of said pair, and means for maintaining a high electrical potential between said electrode means and said electronic conduction means.

13. In electrical sterilizing apparatus, in combination, conveyor means, a plurality of elongated electronic conduction devices spaced on one side of said conveyor means, a plurality of electrode members spaced from said conveyor means on the opposite side thereof, means for moving said electrode members in a closed circuit including a path extending lengthwise of first one of said electronic conduction devices and then lengthwise of another of said devices, spaced therefrom, and means for applying a high electrical potential to said electrode members with respect to said conduction devices to rupture the air space through which said conveyor means passes.

14. In electrical sterilizing apparatus, in combination, conveyor means, a source of high potential electrical energy, an electrical circuit connected to said source including an elongated electronic conduction device on one side of said conveyor means and lying in a plane substantially parallel therewith, a condenser having fixed and movable plates, one of which is connected to said conduction device and the other to one terminal of said source, and electrode means connected to the other terminal of said source and spaced on the other side of said conveyor means and adapted to cooperate with said conduction device to produce a highly-stressed electronic field through which said conveyor means moves.

15. In electrical sterilizing apparatus, in combination, a source of relatively high potential; capacity-forming means connected thereto and including electrode means in the form of a flexible transmission member carrying a plurality of discharge points and guiding means for said member for causing at least a portion thereof to move in a substantially straight line and means for driving said member and hence causing movement of said discharge points along said straight line, and conductive means spaced away from said straight-line path of movement of said discharge points and adapted to form therewith a capacity; means for supporting a product to be sterilized in the space between said capacity-forming means and adjacent said straight-line path of movement of said discharge points; and means interposed between said product-supporting means and said conductive means and substantially alined with said straight-line path of movement for concentrating the flux from said discharge points.

16. In electrical sterilizing apparatus, in combination, a source of relatively high potential; capacity-forming means connected thereto and including electrode means in the form of a flexible transmission member carrying a plurality of discharge points and guiding means for said member for causing at least a portion thereof to move in a substantially straight line and means for driving said member and hence causing movement of said discharge points along said straight line, and conductive means spaced away from said straight-line path of movement of said discharge points and adapted to form therewith a capacity; means for supporting a product to be sterilized in the space between said capacity-forming means and adjacent said straight-line path of movement of said discharge points; means interposed between said product-supporting means and said conductive means and substantially alined with said straight-line path of movement for concentrating the flux from said discharge points; and means for changing at will the spacing between said flux-concentrating means and said discharge points.

17. In electrical sterilizing apparatus, in combination, a source of relatively high potential; capacity-forming means connected thereto and including electrode means in the form of a flexible transmission member carrying a plurality of discharge points and guiding means for said member for causing at least a portion thereof to move in a substantially straight line and means for driving said member and hence causing movement of said discharge points along said straight line, and conductive means spaced away from said straight-line path of movement of said discharge points and adapted to form therewith a capacity; means for supporting a product to be sterilized in the space between said capacity-forming means and adjacent said straight-line path of movement of said discharge points; means interposed between said product-supporting means and said conductive means and substantially alined with said straight-line path of movement for concentrating the flux from said discharge points; and means for changing the spacing between said discharge points and said conductive means.

18. In electrical sterilizing apparatus, in combination, a source of relatively high potential; capacity-forming means connected thereto and including electrode means in the form of a flexible transmission member carrying a plurality of discharge points and guiding means for said member for causing at least a portion thereof to move in a substantially straight line and means for driving said member and hence causing movement of said discharge points along said straight line, and conductive means spaced away from said straight-line path of movement of said discharge points and adapted to form therewith a capacity; a frame for supporting said guiding means and said flexible member and its discharge points; means for effecting relative movement between said frame and said conductive means, thereby to determine the spacing between said discharge points and said conductive means; means for supporting a product to be sterilized in the space between said capacity-forming means and adjacent said straight-line path of movement of said discharge points; and means interposed between said product-supporting means and said conductive means and substantially alined with said straight-line path of movement for concentrating the flux from said discharge points.

19. In electrical sterilizing apparatus, in combination, a source of relatively high potential; capacity-forming means connected thereto and including electrode means in the form of a flexible transmission member carrying a plurality of discharge points and guiding means for said member for causing at least a portion thereof to move in a substantially straight line and means for driving said member and hence causing movement of said discharge points along said straight line, and conductive means spaced away from said straight-line path of movement of said discharge points and adapted to form therewith a capacity; means for supporting a product to be sterilized in the space between said capacity-forming means and adjacent said straight-line path of movement of said discharge points; a frame for supporting said guiding means and said flexible member with its discharge points; and means for effecting relative movement between said product-supporting means and said frame.

20. In electrical sterilizing apparatus, in combination, means for supporting a product to be sterilized; an electrode member spaced from said supporting means on one side thereof; means for moving said electrode member in a closed circuit including a path extending crosswise of said supporting means and moving along said path in one direction and then in a path crosswise of said supporting means and moving along said second-mentioned path in opposite direction; and means for applying a high electrical potential to said electrode member to rupture the space between it and said supporting means and in which space is said product.

21. In electrical sterilizing apparatus, in combination, means for supporting a product to be sterilized; an electrode member spaced from said supporting means on one side thereof; means for moving said electrode member in a closed circuit including a path extending crosswise of said supporting means and moving along said path in one direction and then in a path crosswise of said supporting means and moving along said second-mentioned path in opposite direction; means on the opposite side of said supporting means from said electrode member and extending lengthwise of the path of movement of said electrode member for concentrating flux emanating from said electrode member when the latter is energized; and means for applying a high electrical potential to said electrode member to rupture the space between it and said supporting means and in which space is said product.

22. In electrical sterilizing apparatus, in combination, conveyor means for conveying a product to be sterilized; a frame overhanging said conveyor means, said frame having depending therefrom a plurality of rotary members, flexible electrode means extending between and about said rotary members, said rotary members being spaced so that said electrode means overhang said conveyor means, and means for driving at least one of said rotary members; a frame for supporting said conveyor means against sagging; and means supported by said second-mentioned frame and underneath said conveyor means for concentrating flux emanating from said electrode means.

23. In electrical sterilizing apparatus, in combination, conveyor means for conveying a product to be sterilized; a frame overhanging said conveyor means, said frame having depending therefrom a plurality of rotary members, flexible electrode means extending between and about said rotary members, said rotary members being spaced so that said electrode means overhang said conveyor means, and means for driving at least one of said rotary members; means spaced from said conveyor means and forming with said electrode means an electrical capacity; means for applying a relatively high electrical potential across said last-mentioned means and said electrode means; and means for concentrating the flux emanating from said electrode means.

FRANKLIN S. SMITH.